(12) United States Patent
Kou et al.

(10) Patent No.: US 12,472,570 B2
(45) Date of Patent: Nov. 18, 2025

(54) ELECTRICAL DISCHARGE MACHINING APPARATUS

(71) Applicant: HIGHLIGHT TECH CORP., Tainan (TW)

(72) Inventors: Chwung-Shan Kou, Tainan (TW); Wen-Yung Yeh, Tainan (TW)

(73) Assignee: HIGHLIGHT TECH CORP., Tainan (TW)

( * ) Notice: Subject to any disclaimer, the term of this patent is extended or adjusted under 35 U.S.C. 154(b) by 861 days.

(21) Appl. No.: 17/742,444

(22) Filed: May 12, 2022

(65) Prior Publication Data

US 2022/0362870 A1    Nov. 17, 2022

Related U.S. Application Data

(60) Provisional application No. 63/252,652, filed on Oct. 6, 2021, provisional application No. 63/188,478, filed on May 14, 2021.

(30) Foreign Application Priority Data

May 5, 2022  (TW) .................................. 111117038

(51) Int. Cl.
*B23H 1/04*       (2006.01)
*B23H 11/00*      (2006.01)

(52) U.S. Cl.
CPC .............. *B23H 1/04* (2013.01); *B23H 11/003* (2013.01)

(58) Field of Classification Search
CPC . B23H 7/02; B23H 1/028; B23H 1/04; B23H 11/003; B23H 7/10; B23H 7/105;
(Continued)

(56) References Cited

U.S. PATENT DOCUMENTS

| 4,103,137 A | 7/1978 | Levitt et al. |
| 5,951,884 A * | 9/1999 | Futamura ................. B23H 9/10 |
| | | 219/69.17 |
| 2018/0133928 A1 | 5/2018 | Jang et al. |

FOREIGN PATENT DOCUMENTS

| CN | 104220201 B | 9/2016 |
| CN | 106825806 A | 6/2017 |

(Continued)

*Primary Examiner* — Vy T Nguyen

(57) ABSTRACT

An electrical discharge machining apparatus comprises a carrier and an electrical discharge machining (EDM) unit. The carrier is provided with a jig comprising a carrier plate for carrying a to-be-machined object, and the to-be-machined object is defined with a machining target area. The electrical discharge machining (EDM) unit applies a discharge energy to the machining target area through a discharge electrode with a non-uniform electric field distribution, so that the electric field is concentrated on a traveling direction. The carrier plate has an adhesive layer capable of adhering and fixing the to-be-machined object, capable of avoiding jitter of the to-be-machined object during an electrical discharge machining procedure, and capable of avoiding burrs before an end of the electrical discharge machining procedure, and making the machining target area to be located above the carrier plate to be capable of preventing the jig from hindering the electrical discharge machining procedure.

35 Claims, 27 Drawing Sheets

(58) Field of Classification Search
CPC ... B23H 7/14; B23H 7/22; B23H 7/26; B23H 7/265; B23H 9/00; H01L 21/67092; H01L 21/67754
USPC .......... 219/69.17, 69.15, 69.12, 69.11, 69.2, 219/69.13, 69.16, 117.1, 108, 118, 219/121.72, 69.1, 69.14, 69.19, 78.02, 219/86.25, 93
See application file for complete search history.

(56) References Cited

FOREIGN PATENT DOCUMENTS

| | | | |
|---|---|---|---|
| JP | S61182730 | | 8/1986 |
| JP | H01205925 | A | 8/1989 |
| JP | H01228728 | A | 9/1989 |
| JP | H06079143 | | 11/1994 |
| JP | 2001156320 | | 6/2001 |
| JP | 2004186589 | | 7/2004 |
| JP | 2011131319 | | 7/2011 |
| JP | 2011131319 | A * | 7/2011 |
| JP | 2012200801 | A * | 10/2012 |
| JP | 2012245567 | A | 12/2012 |
| JP | 2016097497 | A | 5/2016 |
| TW | 202032690 | A | 9/2020 |
| WO | WOA2015151375 | | 10/2015 |
| WO | WOA2020213040 | | 10/2020 |

* cited by examiner

ELECTRICAL DISCHARGE MACHINING APPARATUS

CROSS-REFERENCE TO RELATED APPLICATION

This application claims priority to U.S. Provisional Patent Application No. 63/188,478, filed on May 14, 2021; claims priority from U.S. Provisional Patent Application No. 63/252,652, filed on Oct. 6, 2021; and claims priority from Taiwan Patent Application No. 111117038, filed on May 5, 2022, each of which is hereby incorporated herein by reference in its entireties.

BACKGROUND OF THE INVENTION

1. Field of Invention

The invention relates to a machining apparatus, and more particularly to an electrical discharge machining apparatus.

2. Description of the Related Art

With the booming semiconductor industry, electrical discharge machining technology has been commonly used to process ingots or wafers. Electrical discharge machining (EDM) is a manufacturing process in which sparks are generated by electrical discharges whereby a desired shape of a to-be-machined object can be obtained. A dielectric material separates two electrodes and a voltage is applied to generate rapidly recurring current discharges between the two electrodes to machine the to-be-machined object. Electrical discharge machining technology uses two electrodes, one of which is called the tool electrode, or the discharge electrode, while the other is called the workpiece electrode, connected to the to-be-machined object. During electrical discharge machining, there is no physical contact between the discharge electrode and the workpiece electrode.

When the potential difference between the two electrodes is increased, the electric field between the two electrodes becomes greater until the intensity of the electric field exceeds the dielectrical strength, causing dielectric breakdown, current flows through the two electrodes, and part of the material is removed. Once the current stops, new dielectric material is conveyed into the inter-electrode electric field, enabling the partial material to be carried away and restoring the dielectric insulating effect. After a current flow, the potential difference between the two electrodes is restored to what it was before the dielectric break down, so that a new dielectric breakdown can occur to repeat the cycle.

However, the disadvantage of the electrical discharge machining technology is that the roughness of the cut surface is not good, and there are quite a few surface cracks on the cut surface, which even extend along the non-cut direction, resulting in cracking effect in an unexpected direction. Moreover, in the existing electrical discharge machining technology, for example, when cutting an ingot, a jig is used to clamp a periphery of the ingot, that is, the side edge of the ingot is radially clamped to prevent rolling or displacement. However, since the cut surface of the ingot is also located in the radial direction, the conventional technology can only cut the ingot exposed on the outer side of the jig, and cannot cut the area where the jig and the ingot overlap, so in the conventional technology, the machine or apparatus needs to be stopped to readjust the position to enable cutting again. However, no matter how the position is adjusted, there will always be partial areas between the jig and the ingot that overlap each other, and electrical discharge machining cannot be performed.

SUMMARY OF THE INVENTION

In view of the above, one object or more than one object of the invention is/are to provide an electrical discharge machining apparatus to solve the above-mentioned problems of the prior art.

In order to achieve the aforementioned object or objects, the invention provides an electrical discharge machining apparatus comprising a carrier, the carrier is provided with a jig, the jig comprises a carrier plate for carrying at least one to-be-machined object, wherein the to-be-machined object is defined with a machining target area; and an electrical discharge machining (EDM) unit, the electrical discharge machining (EDM) unit applies a discharge energy to the machining target area of the to-be-machined object through at least one discharge electrode with a non-uniform electric field distribution, thereby machining the to-be-machined object along the machining target area.

Preferably, two sides of the discharge electrode are coated with an electrical shielding structure, thereby enabling the discharge energy to form the non-uniform electric field distribution.

Preferably, the discharge electrode has a recessed area, thereby enabling the discharge energy to form the non-uniform electric field distribution.

Preferably, a cross-sectional shape of the discharge electrode is T-shaped, l-shaped or elliptical, thereby enabling the discharge energy to form the non-uniform electric field distribution.

Preferably, a cross-sectional shape of the discharge electrode is circular-shaped, thereby enabling the discharge energy to form the non-uniform electric field distribution.

Preferably, the discharge electrode is in a shape of a wire or a plate.

Preferably, the electrical shielding structure is a supporting structure.

Preferably, the discharge electrode or the supporting structure has a guide bump, the guide bump corresponds to a guide groove of a pulley of the electrical discharge machining (EDM) unit, so as to use the guide groove to guide the guide bump.

Preferably, the discharge electrode is a magnetic element, when the discharge electrode machines the to-be-machined object along the machining target area, the electrical discharge machining (EDM) unit acts on the magnetic element with a magnetic attraction force in a non-contact manner, thereby fixing an orientation of the discharge electrode.

Preferably, the discharge electrode comprises a first conductive wire and a second conductive wire, and a thickness and/or an applied voltage of the first conductive wire are different from that of the second conductive wire.

Preferably, further comprising a microwave or radio-frequency source for providing a microwave or radio-frequency energy to the machining target area of the to-be-machined object through the discharge electrode of the electrical discharge machining (EDM) unit.

Preferably, the to-be-machined object and/or the jig further have/has a conductive gain layer, so as to improve an electrical contact between the to-be-machined object and the jig.

Preferably, further comprising a heat source for heating the to-be-machined object on the carrier plate, so as to improve an electrical contact between the to-be-machined object and the jig.

Preferably, the discharge electrode cuts the machining target area of the to-be-machined object in a fluid.

Preferably, the discharge electrode cuts the machining target area of the to-be-machined object in a vacuum environment.

Preferably, a quantity of the discharge electrode is one or more than one.

Preferably, a quantity of the to-be-machined object is one or more than one.

In order to achieve the aforementioned object or objects, the invention provides an electrical discharge machining apparatus comprising: a carrier, the carrier is provided with a jig, the jig comprises a carrier plate for carrying at least one to-be-machined object, wherein the to-be-machined object is defined with a machining target area, and a position of the machining target area of the to-be-machined object is located above the carrier plate; and an electrical discharge machining (EDM) unit for applying a discharge energy to the machining target area of the to-be-machined object through at least one discharge electrode, thereby machining the to-be-machined object along the machining target area.

Preferably, the jig further has two side plates disposed on two ends of the carrier plate, and the two side plates are used to be located on two sides of the to-be-machined object, respectively.

Preferably, the jig has an adhesive layer disposed on the carrier plate, and a periphery of the to-be-machined object is partially adhered on the adhesive layer of the jig.

Preferably, the adhesive layer is a conductive adhesive layer.

Preferably, the adhesive layer is discontinuously disposed on the carrier plate.

Preferably, the adhesive layer extends upward from the carrier plate to reach at least one side of the to-be-machined object.

Preferably, the adhesive layer infiltrates into the to-be-machined object.

Preferably, the jig has a conductive plate disposed on the carrier plate.

Preferably, the jig has a conductive plate disposed on the carrier plate, and the adhesive layer is disposed on the conductive plate.

Preferably, the conductive plate is a conductive metal structure with a work function below 4.5 eV.

Preferably, the discharge electrode applies the discharge energy to the machining target area of the to-be-machined object with a non-uniform electric field distribution.

Preferably, the carrier adjusts an inclination of the jig relative to the discharge electrode or the electrical discharge machining (EDM) unit adjusts an inclination of the discharge electrode relative to the to-be-machined object, so as to adjust an included angle of the machining target area of the to-be-machined object relative to the carrier plate of the jig.

Preferably, the to-be-machined object and/or the jig further have/has a conductive gain layer, so as to improve an electrical contact between the to-be-machined object and the jig.

Preferably, further comprising a heat source for heating the to-be-machined object on the carrier plate, so as to improve an electrical contact between the to-be-machined object and the jig.

Preferably, the discharge electrode cuts the machining target area of the to-be-machined object in a fluid.

Preferably, the discharge electrode cuts the machining target area of the to-be-machined object in a vacuum environment.

Preferably, a quantity of the discharge electrode is one or more than one.

Preferably, a quantity of the to-be-machined object is one or more than one.

In summary, the electrical discharge machining apparatus of the invention has the following advantages:

(1) The electric field can be concentrated on the traveling direction by the non-uniform electric field distribution design.

(2) The electric field distribution in the non-traveling direction can be reduced by the non-uniform electric field distribution design, so the surface roughness and surface cracks of the to-be-machined object on the non-traveling direction can be reduced.

(3) By disposing the adhesive layer on the jig, jitter phenomenon of the to-be-machined object during a process of the electrical discharge machining procedure can be avoided, and burr phenomenon before an end of the electrical discharge machining procedure can further be avoided.

(4) By disposing the adhesive layer on the jig, the jig hindering performing of the electrical discharge machining procedure on the to-be-machined object can be prevented, so the electrical discharge machining procedure can be performed more flexibly.

(5) With the discharge electrode having a plurality of conductive wires, the cutting step and the grinding or polishing step can be performed at the same time, so performing of the overall machining procedure can be accelerated, and a surface with low roughness can be obtained.

(6) The electrical contact between the to-be-machined object and the jig can be improved by the conductive gain layer of the to-be-machined object and/or the jig, thereby improving an efficiency of the electrical discharge machining procedure.

In order to enable the examiner to have a further understanding and recognition of the technical features of the invention and the technical efficacies that can be achieved, preferred embodiments in conjunction with detailed explanation are provided as follows.

DETAILED DESCRIPTION OF THE INVENTION

Figure 1:
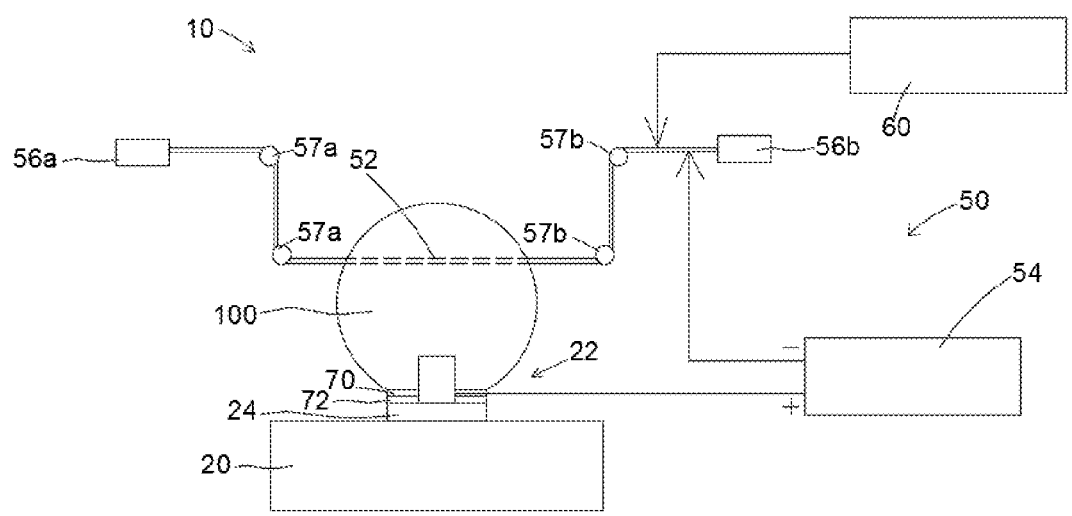
FIG. 1 is a structural schematic diagram of an electrical discharge machining apparatus of the invention view from a front of a jig.

In order to understand the technical features, content and advantages of the invention and its achievable efficacies, the invention is described below in detail in conjunction with the figures, and in the form of embodiments, the figures used herein are only for a purpose of schematically supplementing the specification, and may not be true proportions and precise configurations after implementation of the invention; and therefore, relationship between the proportions and configurations of the attached figures should not be interpreted to limit the scope of the claims of the invention in actual implementation. In addition, in order to facilitate understanding, the same elements in the following embodiments are indicated by the same referenced numbers. And the size and proportions of the components shown in the drawings are for the purpose of explaining the components and their structures only and are not intending to be limiting.

Unless otherwise noted, all terms used in the whole descriptions and claims shall have their common meaning in the related field in the descriptions disclosed herein and in other special descriptions. Some terms used to describe in the present invention will be defined below or in other parts of the descriptions as an extra guidance for those skilled in the art to understand the descriptions of the present invention.

The terms such as "first", "second", "third" used in the descriptions are not indicating an order or sequence, and are not intending to limit the scope of the present invention. They are used only for differentiation of components or operations described by the same terms.

Figure 2:
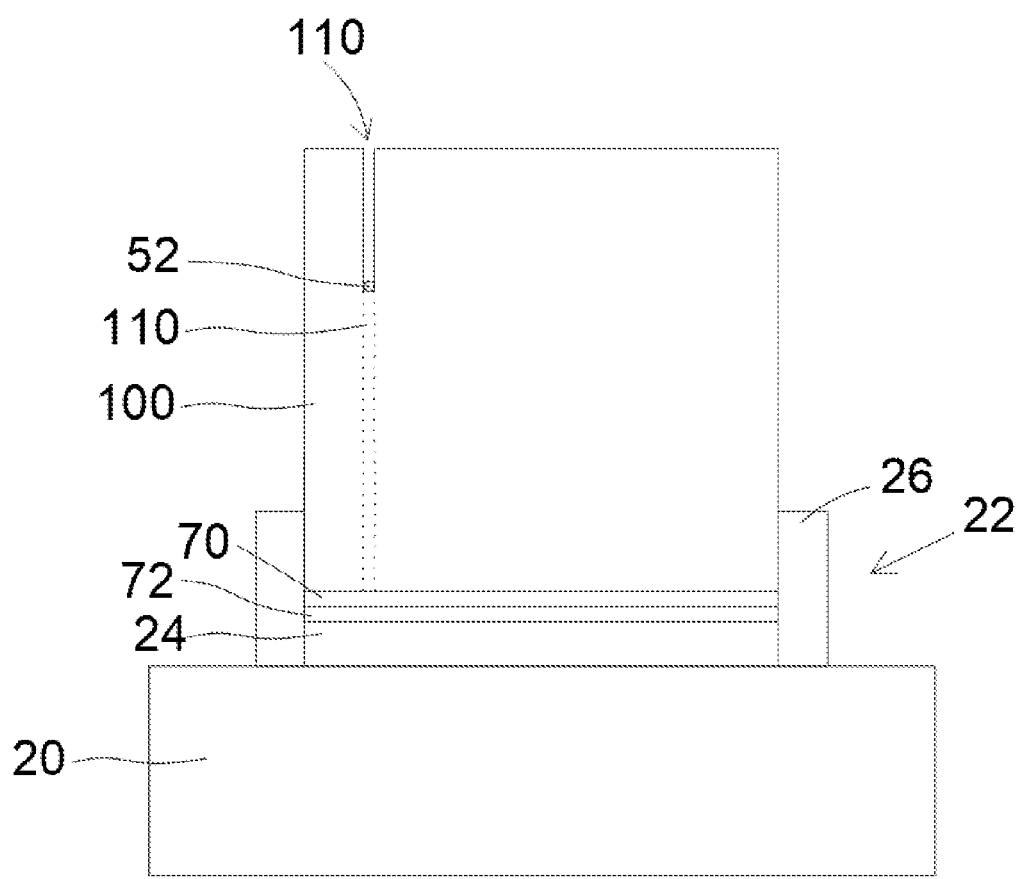
FIG. 2 is a partial structural schematic diagram of the electrical discharge machining apparatus of the invention view from a side of the jig.

Moreover, the terms "comprising", "including", "having", and "with" used in the descriptions are all open terms and have the meaning of "comprising but not limited to". The invention provides a processing device and a processing method for a solid struct Please refer to FIG. 1 and FIG. 2. FIG. 1 is a structural schematic diagram of an electrical discharge machining apparatus of the invention view from a front of a jig, and FIG. 2 is a partial structural schematic diagram of the electrical discharge machining apparatus of the invention view from a side of the jig. An electrical discharge machining apparatus 10 of the invention comprises a carrier 20 and an electrical discharge machining (EDM) unit 50 for performing an electrical discharge machining procedure, such as cutting and/or electric discharge grinding (EDG) on a to-be-machined object 100. The carrier 20 is provided with a jig 22, and the carrier 20 can be a movable carrier or a fixed carrier. The jig 22 at least comprises a carrier plate 24 for placing the to-be-machined object 100, wherein the to-be-machined object 100 is defined with a machining target area 110, and the machining target area 110 can be located at any position in the to-be-machined object 100 suitable for machining. The to-be-machined object 100 can be any conductor or semiconductor structure, such as a wafer or an ingot, but a cross-section of the to-be-machined object 100 is not limited to circular shape, and can be any shape.

Figure 3:
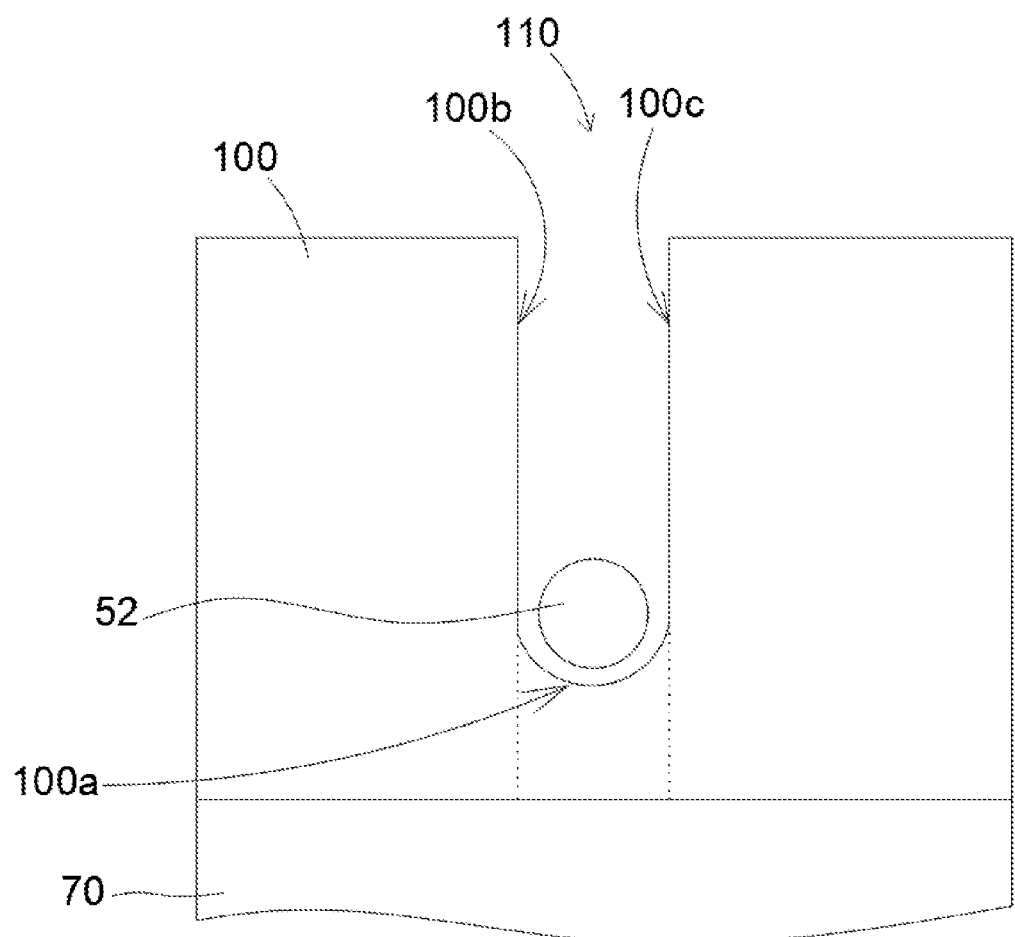
FIG. 3 is a partially enlarged schematic diagram of the electrical discharge machining apparatus of the invention performing an electrical discharge machining procedure, wherein a discharge electrode is a single conductive wire.
Figure 4:
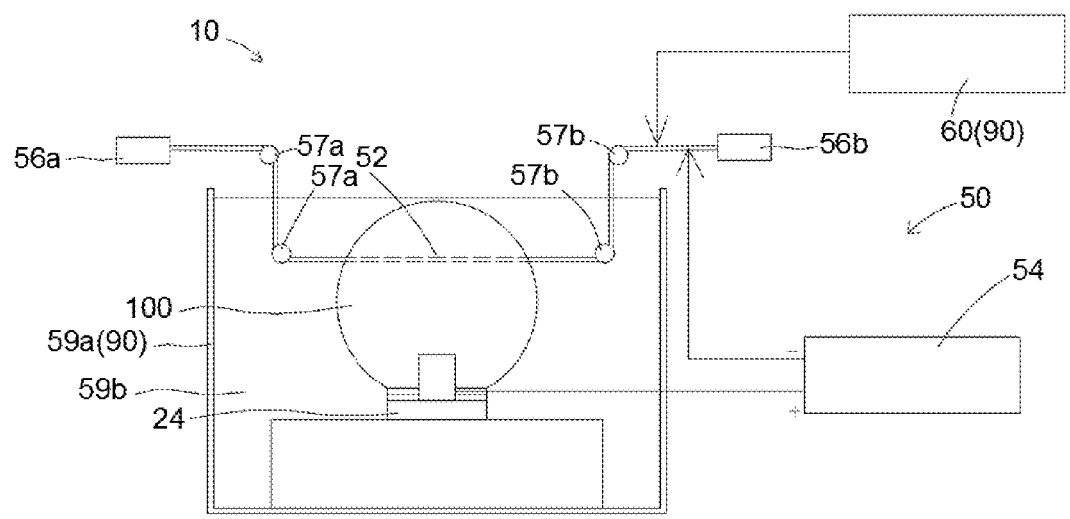
FIG. 4 is a structural schematic diagram of the electrical discharge machining apparatus of the invention in which the electrical discharge machining procedure is performed in a heated liquid tank.

The electrical discharge machining (EDM) unit 50 has a discharge electrode 52, and the discharge electrode 52 is, for example, a wire-shaped conductive wire, a plate-shaped conductive plate, or a conductive structure of other shapes. Taking the to-be-machined object 100 as a cylindrical ingot as an example, the machining target area 110 is defined in a radial direction of the ingot, for example, as shown by the dotted lines in FIG. 2. However, a position of the machining target area 110 is only an example, and is not intended to limit the invention. As shown in FIG. 3, there is a gap between a surface of the discharge electrode 52 and a surface (a cut surface 100*a*) of the to-be-machined object 100 in a traveling direction and surfaces (cut surfaces 100*b*, 100*c*) of the to-be-machined object 100 in a non-traveling direction, wherein the gap is filled with insulating materials such as air, deionized water or oil, or other suitable insulating substances, as dielectric materials. For example, if the electrical discharge machining procedure is performed in deionized water, the deionized water will be filled into the gap described above. Likewise, if the electrical discharge machining procedure is performed in an atmospheric environment, air will be filled into the above-mentioned gap. In addition, as shown in FIG. 4, if the electrical discharge machining procedure is performed in a heated liquid tank 59*a*, a heated liquid 59*b* will be filled into the above-mentioned gap, and the heated liquid 59*b* in the heated liquid tank 59*a*, such as hot oil, is further capable of reducing thermal shock or increasing thermal uniformity. In addition, in a process of the electrical discharge machining procedure, the invention is capable of reducing jitter of the to-be-machined object 100 by liquid pressure, reducing surface roughness of the cut surfaces 100*b*, 100*c*, which are conducive to improving a quality of electrical discharge machining. As described above, the invention is illustrated by the cutting of one to-be-machined object 100 (i.e. a single solid structure) by one discharge electrode 52, as shown in FIG.

Figure 5:
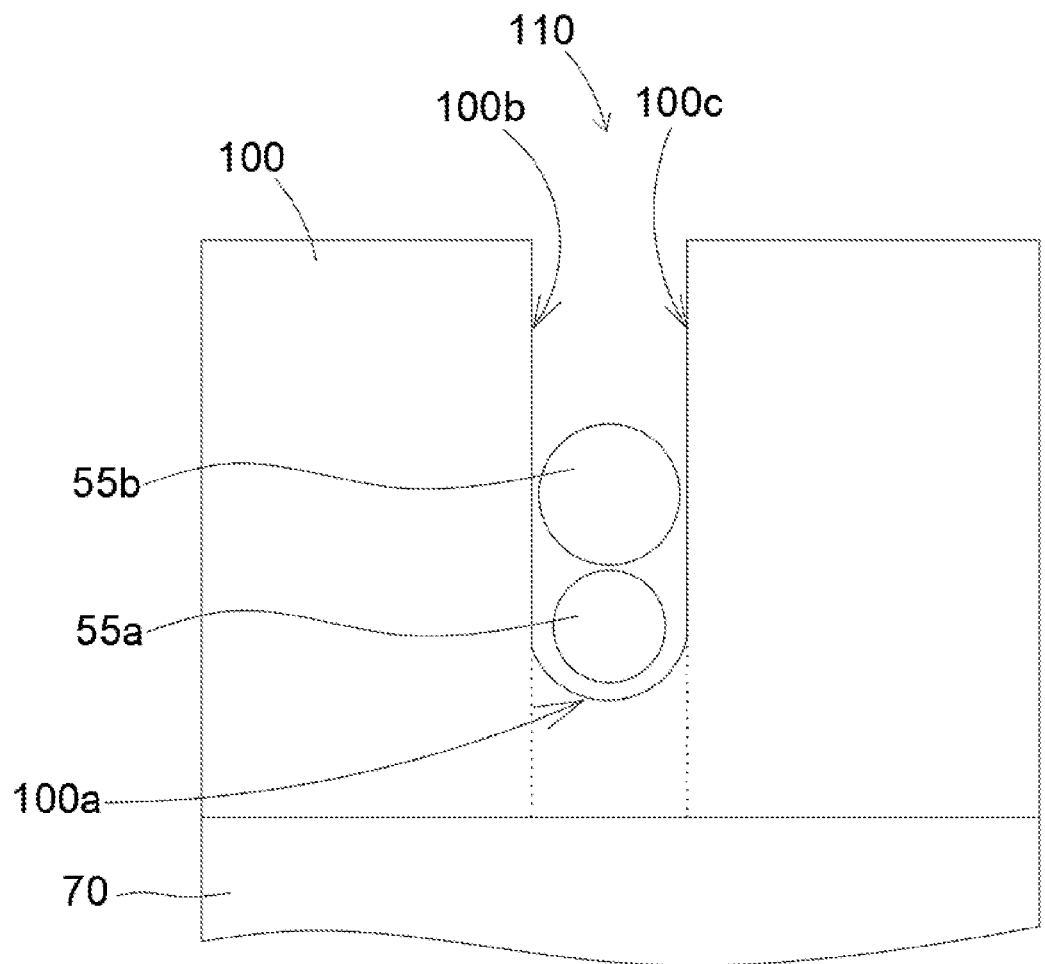
FIG. 5 is a partially enlarged schematic diagram of the electrical discharge machining apparatus of the invention performing the electrical discharge machining procedure, wherein the discharge electrodes are a plurality of conductive wires.
Figure 15A:
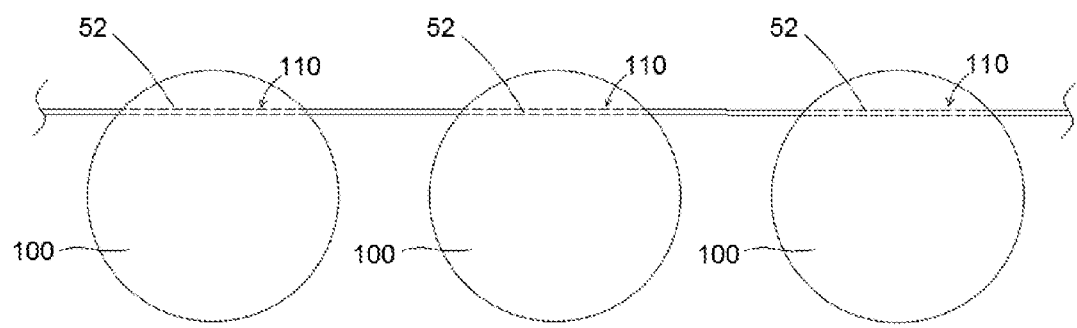
FIG. 15*a* is a schematic diagram of cutting a plurality of to-be-machined objects by using a single discharge electrode.
Figure 15B:
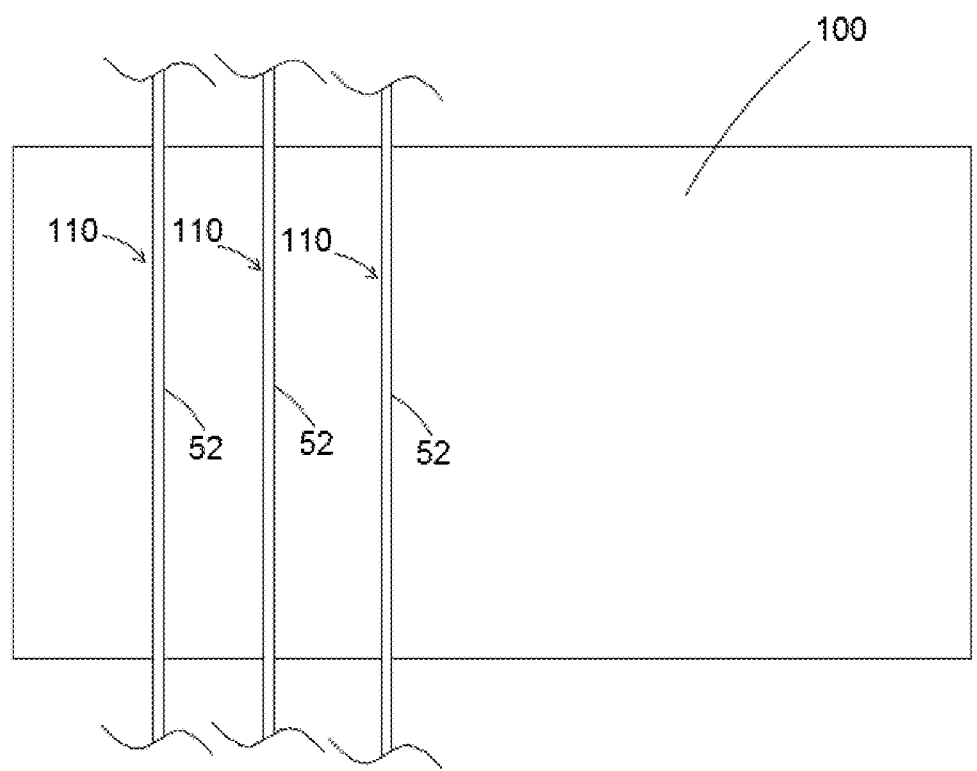
FIG. 15*b* is a schematic diagram of cutting a single to-be-machined object by using a plurality of discharge electrodes.
Figure 15C:
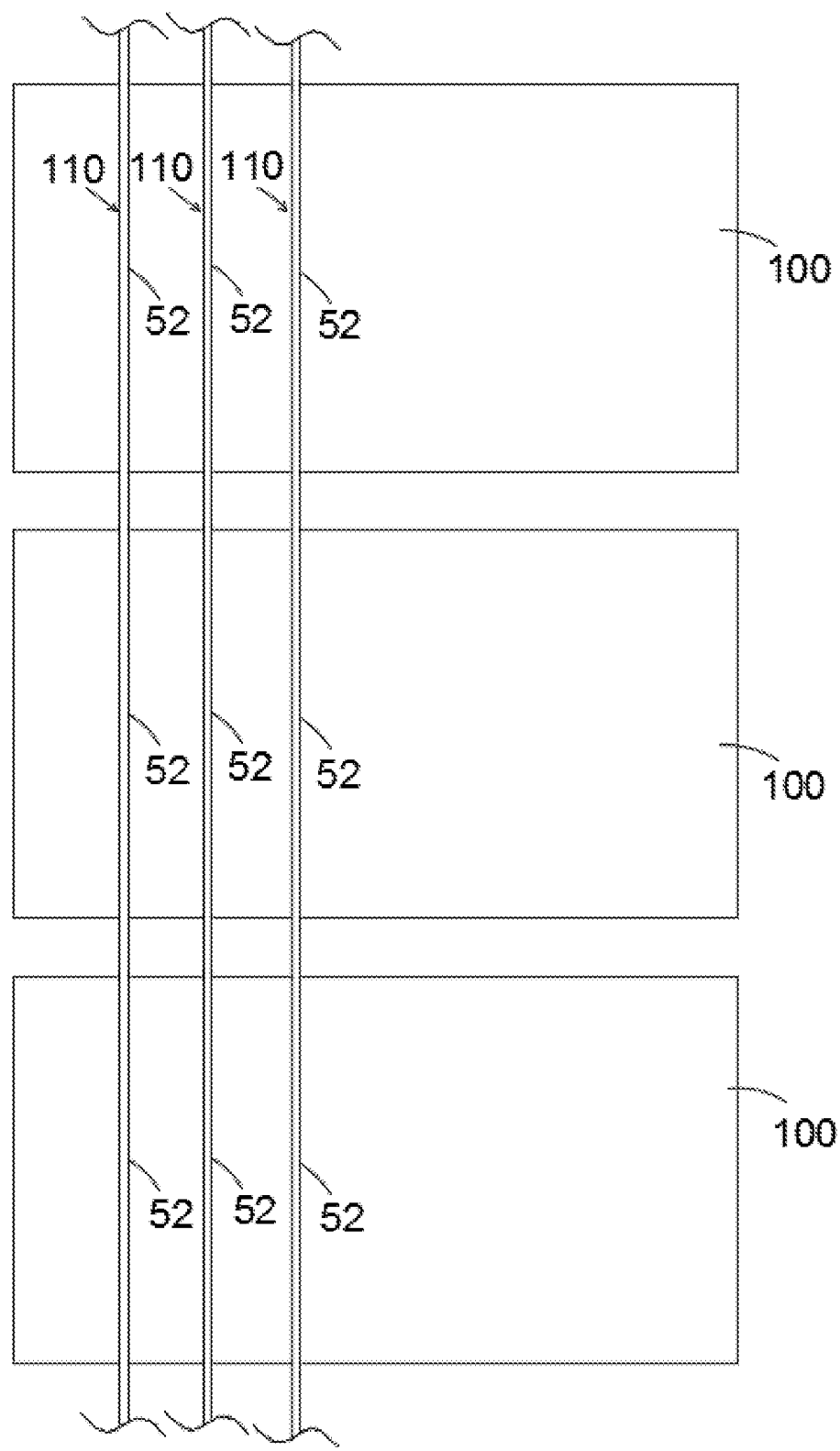
FIG. 15*c* is a schematic diagram of cutting a plurality of to-be-machined objects by using a plurality of discharge electrodes, wherein the viewing angle of FIG. 15*a* is different from that of FIG. 15*b* and FIG. 15*c*.

2, but the invention is not limited thereto. The discharge electrode 52 of the invention can also, for example, perform a discharge process on a plurality of to-be-machined objects 100 (i.e. multiple solid structures) simultaneously, as shown in FIG. 15a, i.e. the discharge electrode 52 can cut multiple to-be-machined objects 100 at the same time. Similarly, the invention also allows a plurality of discrete discharge electrodes 52 (a plurality of conductive structures) to simultaneously cut a single to-be-machined object 100 (as shown in FIG. 15b) or a plurality of to-be-machined objects 100 (as shown in FIG. 15c) at the same time. Furthermore, the discharge machining process of the invention can be carried out not only in a liquid or gaseous fluid, but also in a vacuum environment. In other words, the to-be-machined objects 100 can be cut by the discharge electrode 52 in a wet manner (i.e. in a liquid tank or heated liquid tank 59a), or the to-be-machined objects 100 can be cut by the discharge electrode 52 in a dry manner (i.e. in air or in a vacuum environment). Wherein, during the cutting process of the to-be-machined object 100 by the discharge electrode 52 in the dry manner, the discharge electrode 52 can also be optionally cooled down, for example by using a cooling fluid, such as a liquid or a gas. For example, the temperature of the electrode 52 can be cooled or maintained by using a cooling fluid such as a liquid or gas, or the discharge electrode 52 can be warmed up by the discharging energy, i.e. without using a cooling fluid such as a liquid or a gas. Please continue to refer to FIG. 1 to FIG. 3, the electrical discharge machining (EDM) unit 50 of the invention further has a power source 54, the power source 54 is connected to the discharge electrode 52 by an electrical circuit, so as to generate a voltage difference between the discharge electrode 52 and the to-be-machined object 100. When a numerical value of the voltage difference is greater than an insulating strength provided by the above-mentioned gap, a discharge energy will be generated and provided to the machining target area 110 of the to-be-machined object 100, thereby the to-be-machined object 100 can be machined along the machining target area 110. In addition, taking a linear conductive wire as an example, the discharge electrode 52 of the invention can be a single conductive wire (as shown in FIG. 3), or a plurality of conductive wires. Taking two conductive wires as an example, as shown in FIG. 5, a thickness (diameter) and/or an applied voltage of a first conductive wire 55a can be the same or different from that of a second conductive wire 55b. For example, a thickness of the second conductive wire 55b is substantially larger than a thickness of the first conductive wire 55a, whereby the first conductive wire 55a can be used to cut the cut surface 100a of the to-be-machined object 100 located in the traveling direction (front side), while the second conductive wire 55b can be used to grind or polish the cut surfaces 100b, 100c of the to-be-machined object 100 in the non-traveling direction. Wherein, thicknesses and/or applied voltages of the first conductive wire 55a and the second conductive wire 55b can be determined according to a required roughness of the cut surface, so no example will be further provided. The invention can also optionally comprise a microwave or radio-frequency source 60 for providing microwave energy or radio-frequency energy to the machining target area 110 of the to-be-machined object 100 through the first conductive wire 55a and/or the second conductive wire 55b, so as to provide heating effect, annealing effect, grinding effect or polishing effect to be capable of effectively reducing surface roughness and avoiding the need for performing subsequent mechanical or chemical grinding step or polishing step. Likewise, if the discharge electrode 52 of the invention is merely a single conductive wire, the microwave or radio-frequency source 60 of the invention can also provide microwave energy or radio-frequency energy to the machining target area 110 of the to-be-machined object 100 through this single conductive wire. Taking the microwave or radio-frequency source 60 as a microwave source as an example, a wavelength of microwave of the invention is in a range of about 1 mm to about 1 m, a frequency range is about 300 GHz to about 0.3 GHz, and a power range is about 200 watts to about 5,000 watts, for example. A material of the discharge electrode 52 can be selected from, for example, a group consisting of copper, brass, molybdenum, tungsten, graphite, steel, aluminum and zinc. A thickness of the discharge electrode 52 is less than about 300 μm, and a thickness of the discharge electrode 52 is preferably in a range of about 30 μm to about 300 μm.

In one embodying mode, the discharge energy provided by the discharge electrode 52 of the invention preferably has a non-uniform electric field distribution, and an electric field of the discharge energy provided by the discharge electrode 52 is preferably concentrated in the traveling direction of the discharge electrode 52. That is, the electric field distribution of the discharge electrode 52 in the traveling direction (cut direction) is larger, and the electric field distribution of the discharge electrode 52 in a lateral direction perpendicular to the traveling direction is smaller. In other words, the discharge energy provided by the discharge electrode 52 is preferably concentrated on the to-be-machined object 100 in the traveling direction (front side), while application of the discharge energy to the to-be-machined object 100 in the non-traveling direction (two lateral sides) is reduced, Therefore, a surface roughness of the cut surfaces 100b, 100c of the to-be-machined object 100 in the non-traveling direction can be reduced, for example, Ra and Rz values and surface cracks of the cut surfaces 100b, 100c can be reduced.

Figure 6A:
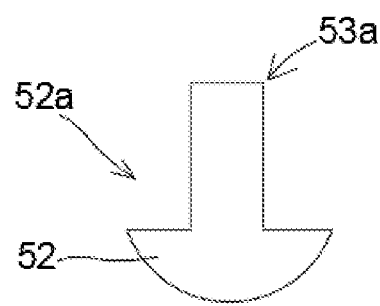
FIGS. 6*a* to 6*g* are schematic diagrams of the discharge electrode and its electrical shielding structure capable of generating a non-uniform electric field distribution in the electrical discharge machining apparatus of the invention.
Figure 6B:
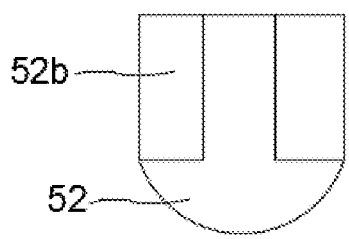
Figure 6C:
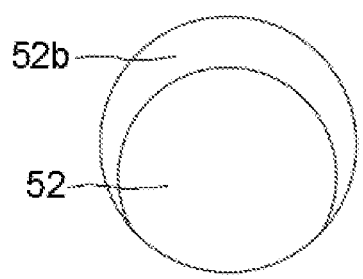
Figure 6D:
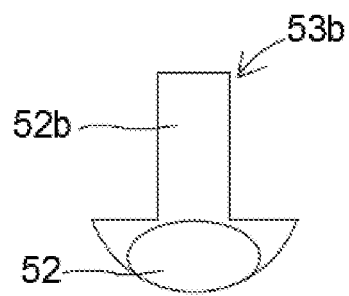
Figure 6E:
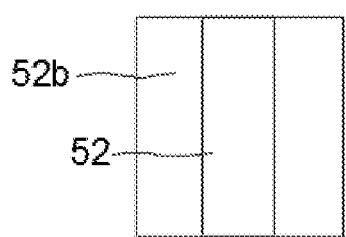
Figure 6F:
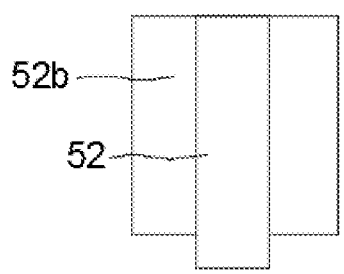
Figure 6G:
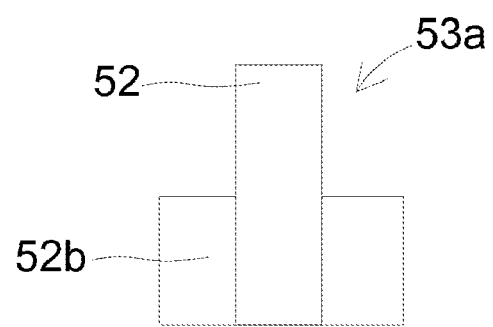

In order to provide the discharge energy with the non-uniform electric field distribution through the discharge electrode 52, as shown in FIG. 6a to FIG. 6g, in the invention, a periphery (e.g., left and right sides or one side) of the discharge electrode 52 can have a recessed area 52a or a periphery (e.g., left and right sides or one side) of the discharge electrode 52 of the invention can have an electrical shielding structure 52b, which is, for example, an insulating material or other suitable material. Both the recessed area 52a and the electrical shielding structure 52b are capable of reducing an electric field expansion range of the discharge electrode 52, thereby reducing a surface roughness of the cut surfaces 100b, 100c of the to-be-machined object 100. For example, a cross-sectional shape of the discharge electrode 52 can be, for example, a T-shape with the recessed area 52a (as shown in FIG. 6a), an l-shape or other shapes. Alternatively, a periphery (e.g., left and right sides or one side) of the discharge electrode 52 is coated with the electrical shielding structure 52b, a cross-sectional shape of the discharge electrode 52 can also be, for example, a T-shape (as shown in FIG. 6b), an l-shape (as shown in FIG. 6e, FIG. 6f, FIG. 6g), circular (as shown in FIG. 6c), elliptical (as shown in FIG. 6d) or other shapes, and preferably only a front side (traveling direction) of the discharge electrode 52 is exposed, so that an electric field of the discharge energy provided by the discharge electrode 52 is concentrated in the traveling direction of the discharge electrode 52. Wherein, in the electrical discharge machining procedure, the recessed area 52a is capable of exerting an effect of fixing the discharge electrode 52 to reduce shaking or rotation phenomenon of the discharge electrode 52 during a cutting process, and further providing an effect of leak drainage.

In addition, as shown in FIG. 1 and FIG. 4, the electrical discharge machining (EDM) unit 50 of the invention can further optionally have a wire feeding reel 56a and a wire take-up reel 56b, wherein two ends of the discharge electrode 52 are respectively connected to the wire feeding reel 56a and the wire take-up reel 56b, the wire feeding reel 56a and the wire take-up reel 56b can respectively use pulleys 57a, 57b to sleeve with the discharge electrode 52, thereby positioning the discharge electrode 52, and for example, adjusting a tension of the discharge electrode 52.

Figure 7A:
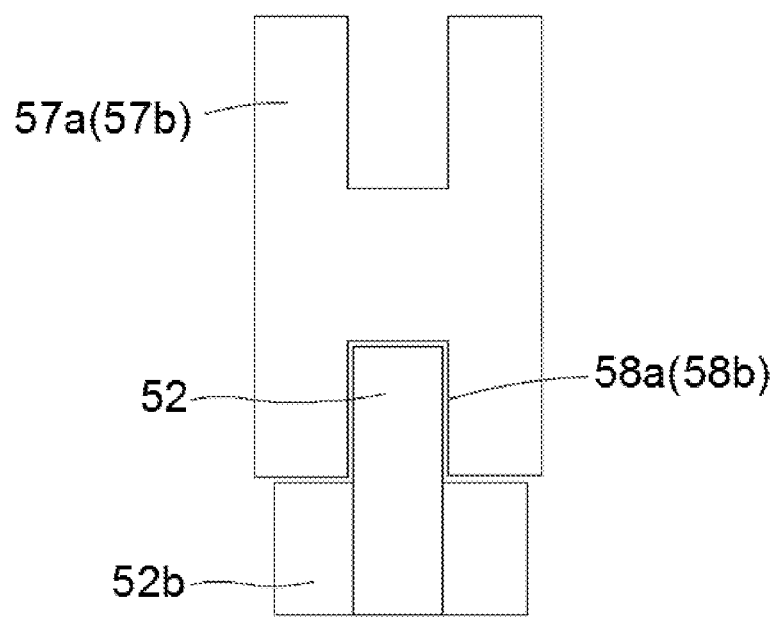
FIGS. 7*a* to 7*b* are schematic diagrams of the discharge electrode and its electrical shielding structure having a guide bump corresponding to a guide groove of a pulley in the electrical discharge machining apparatus of the invention.
Figure 7B:
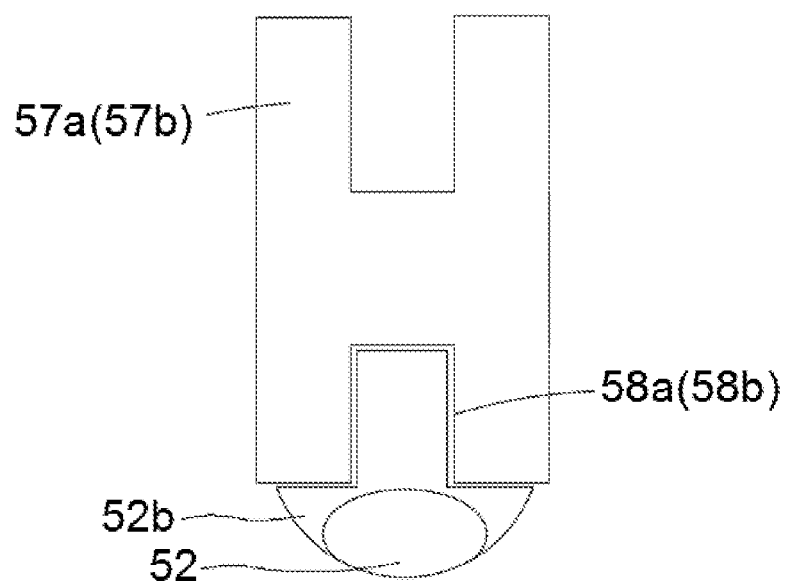

Therefore, the discharge electrode 52 of the electrical discharge machining (EDM) unit 50 of the invention can optionally have guide bumps 53a (as shown in FIG. 6g) corresponding to guide grooves 58a, 58b of the pulleys 57a, 57b (as shown in FIG. 7a), and/or, the electrical shielding structure 52b can not only coat a periphery of the discharge electrode 52, but also optionally have guide bumps 53b (as shown in FIG. 6d) corresponding to the guide grooves 58a, 58b of the pulleys 57a, 57b (as shown in FIG. 7b), so as to serve as supporting structures at the same time.

Figure 8A:
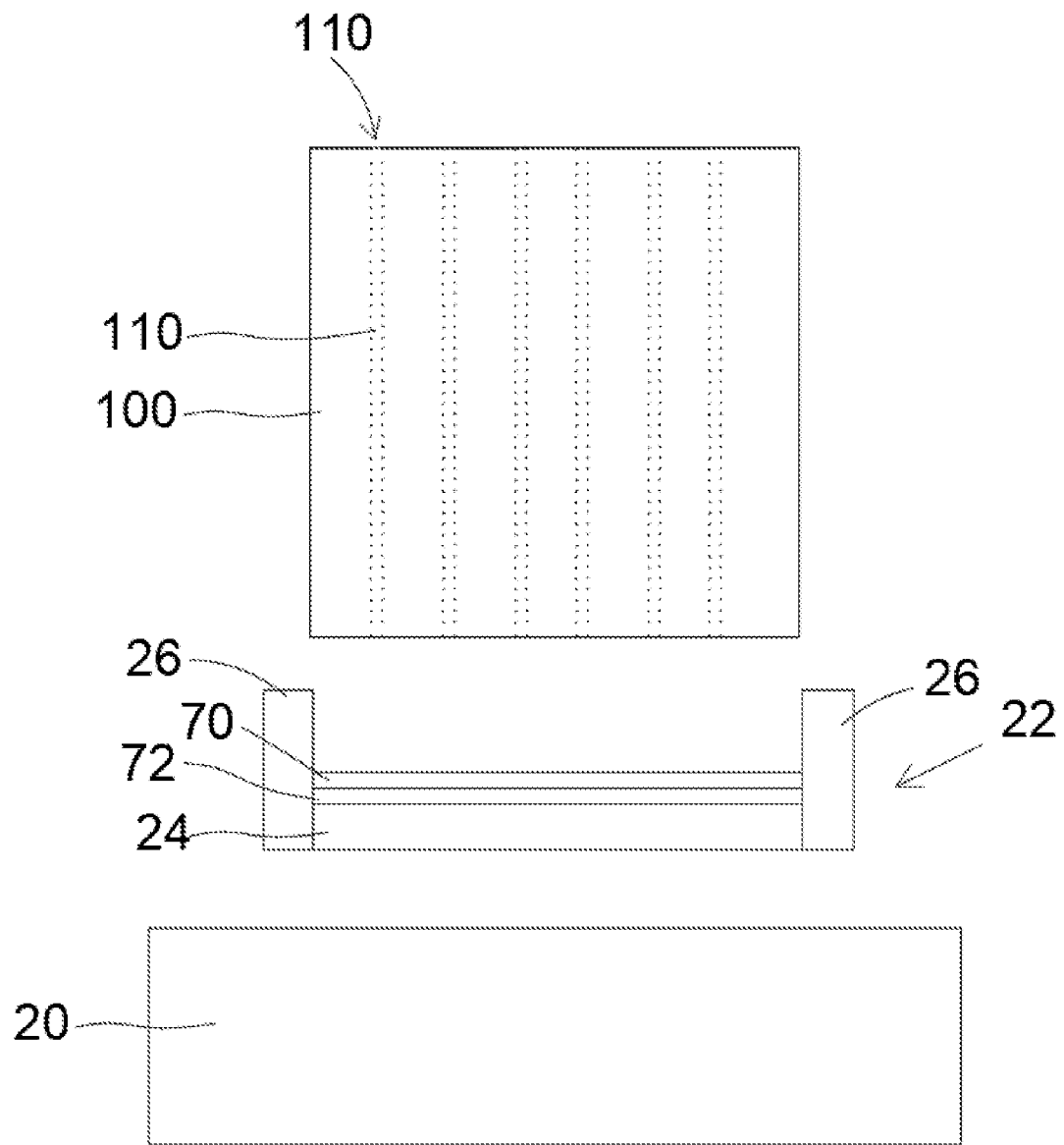
FIGS. 8*a* to 8*c* are exploded schematic diagrams of a to-be-machined object, a jig and a carrier of the electrical discharge machining apparatus of the invention.
Figure 8B:
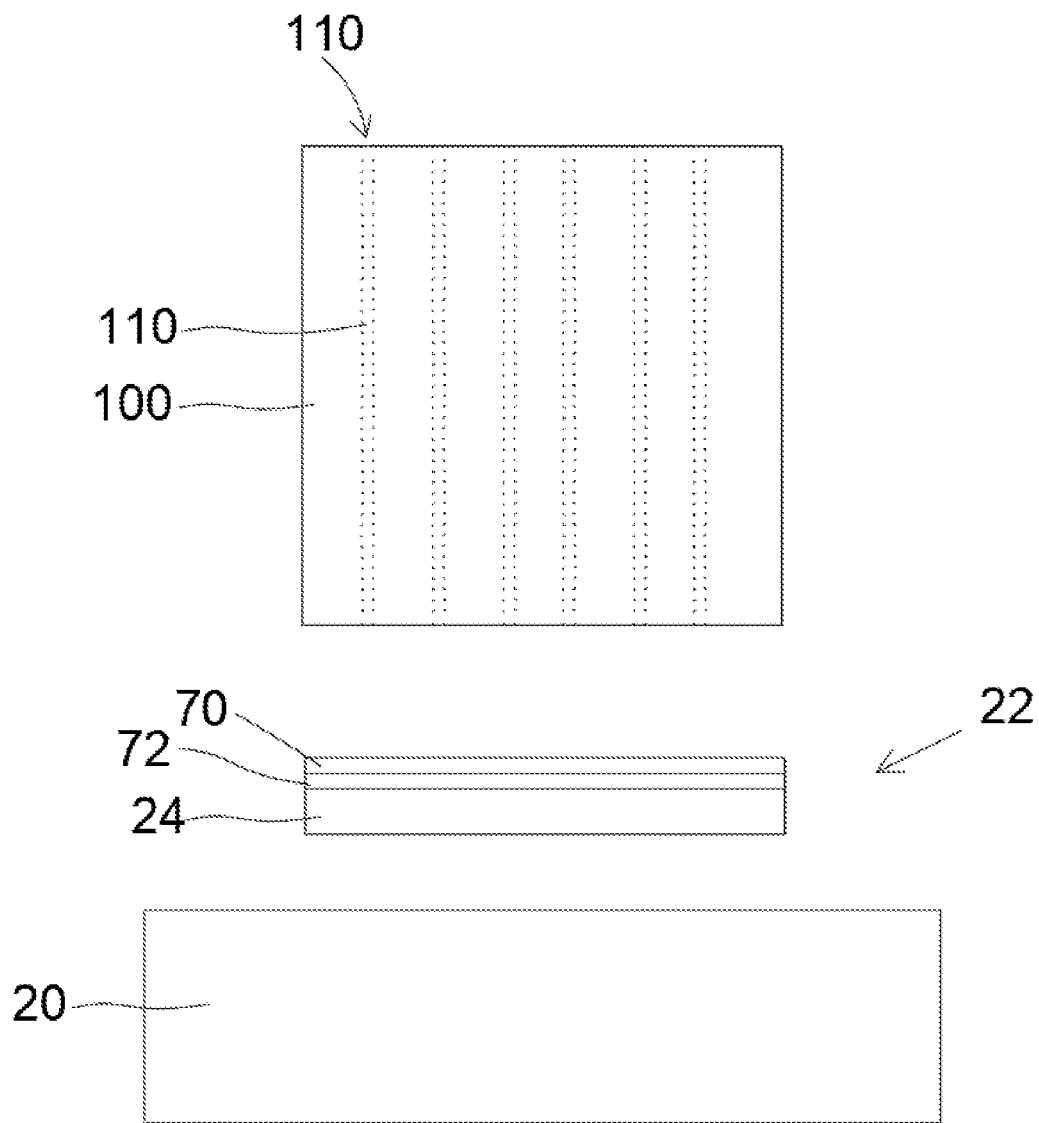
Figure 8C:
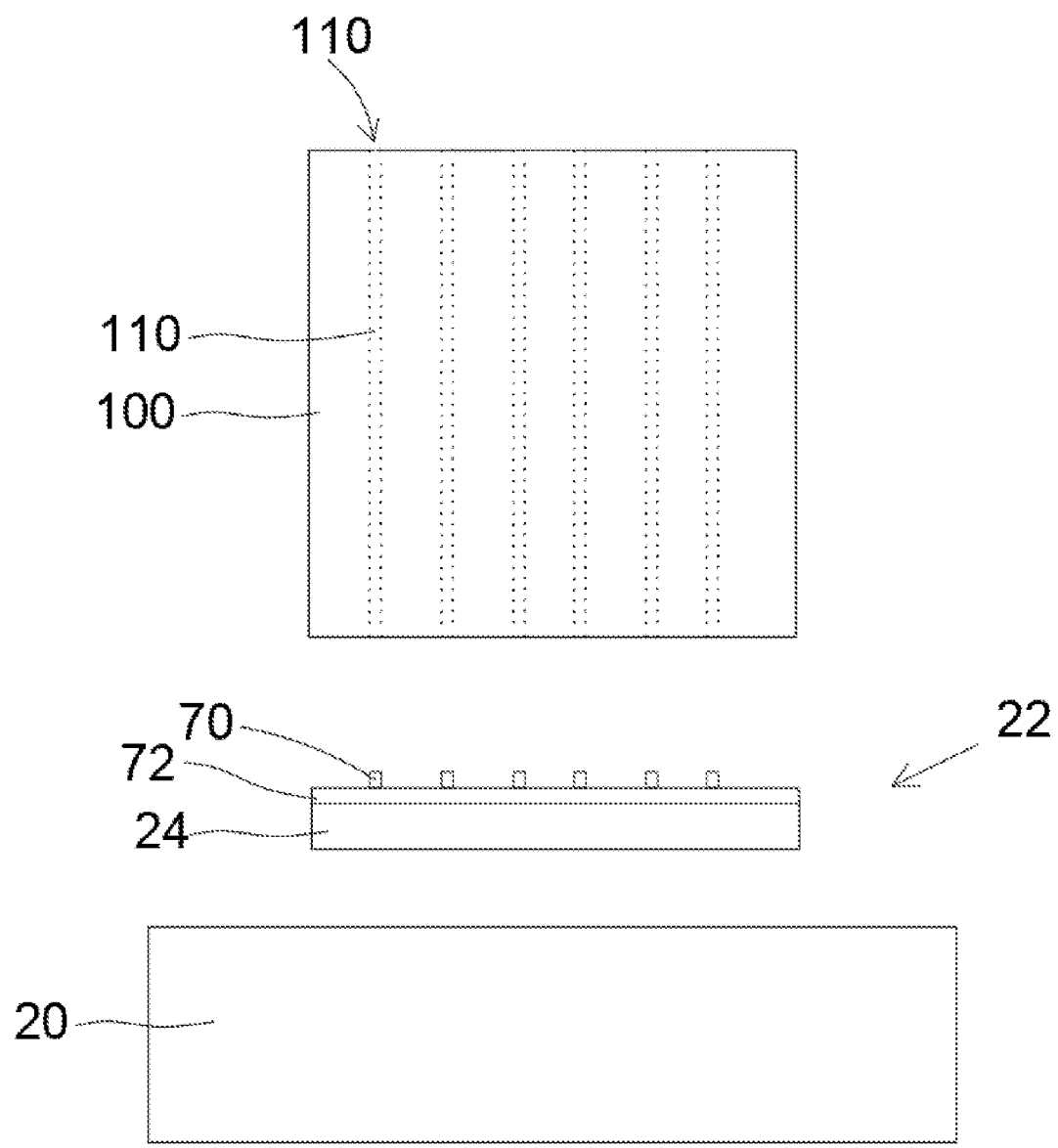

In addition, please refer to FIG. 1 to FIG. 12b, in order to avoid phenomenon of jitter (shaking) of the to-be-machined object 100 during a process of the electrical discharge machining procedure performed by the discharge electrode 52 or to avoid burr phenomenon before an end of the electrical discharge machining procedure, the jig 22 of the invention is further optionally provided with an adhesive layer 70 disposed on the carrier plate 24. A periphery of the to-be-machined object 100 is partially adhered on the adhesive layer 70, so that the to-be-machined object 100 is firmly adhered on the carrier plate 24 of the jig 22. Wherein, the adhesive layer 70 is not limited to be provided on the carrier plate 24 in a continuous manner (as shown in FIG. 8b) or a discontinuous manner (as shown in FIG. 8c). Taking the discontinuous manner as an example, the adhesive layer 70 is disposed on the carrier plate 24 of the jig 22, for example, at intervals, and its position corresponds to the machining target area 110, that is, a position of the adhesive layer 70 is located below the machining target area 110. A position of the adhesive layer 70 is not limited to being directly below the machining target area 110, as long as the to-be-machined object 100 can be adhered and fixed, any position can be applied to the invention.

Wherein the jig 22 can optionally have a conductive plate 72 disposed on the carrier plate 24, and the adhesive layer 70 is disposed on the conductive plate 72, thereby serving as a buffer layer to prevent the jig 22 from being damaged caused by the electrical discharge machining procedure. The conductive plate 72 is, for example, but not limited to, a material layer with a work function below about 4.5 eV, such as zinc, titanium, aluminum or other suitable conductive metal structures. The adhesive layer 70 further provides functions of conducting, fixing and protecting the conductive plate 72, and has an advantage of being easy to remove. Furthermore, in addition to the adhesive layer 70 disposing on the carrier plate 24 of the jig 22, the jig 22 of the invention can optionally comprise two side plates 26 disposed on two ends of the carrier plate 24 (as shown in FIG. 8a), wherein the two side plates 26 are respectively located on two sides of the to-be-machined object 100, and preferably holding the two sides of the to-be-machined object 100, such as axially holding the ingot to be capable of preventing the to-be-machined object 100 from sliding or toppling when a machining angle is inclined, and the side plates 26 can also be offset from a travel route of the discharge electrode 52, thereby preventing the jig 22 from hindering the electrical discharge machining procedure of the to-be-machined object 100. In addition, the invention can also omit the adhesive layer 70, that is, the to-be-machined object 100 can be directly placed on the conductive plate 72 of the jig 22, if the adhesive layer 70 is omitted, the invention can also optionally use the two side plates 26 of the jig 22 to directly hold the two sides of the to-be-machined object 100 to be capable of preventing the to-be-machined object 100 from sliding or toppling. Wherein, the adhesive layer 70 can be a non-conductive adhesive layer or a conductive adhesive layer, as long as the to-be-machined object 100 can be adhered on the carrier plate 24 or adhered on the conductive plate 72 of the jig 22, either non-conductive adhesive layer or conductive adhesive layer can be applied to the invention, and a bonding area between the adhesive layer 70 and the to-be-machined object 100 is not limited, as long as the to-be-machined object 100 is capable of being electrically conducted to the carrier plate 24 or the conductive plate 72 below it to form an electrical circuit, any bonding area can be applied to the invention.

Figure 9:
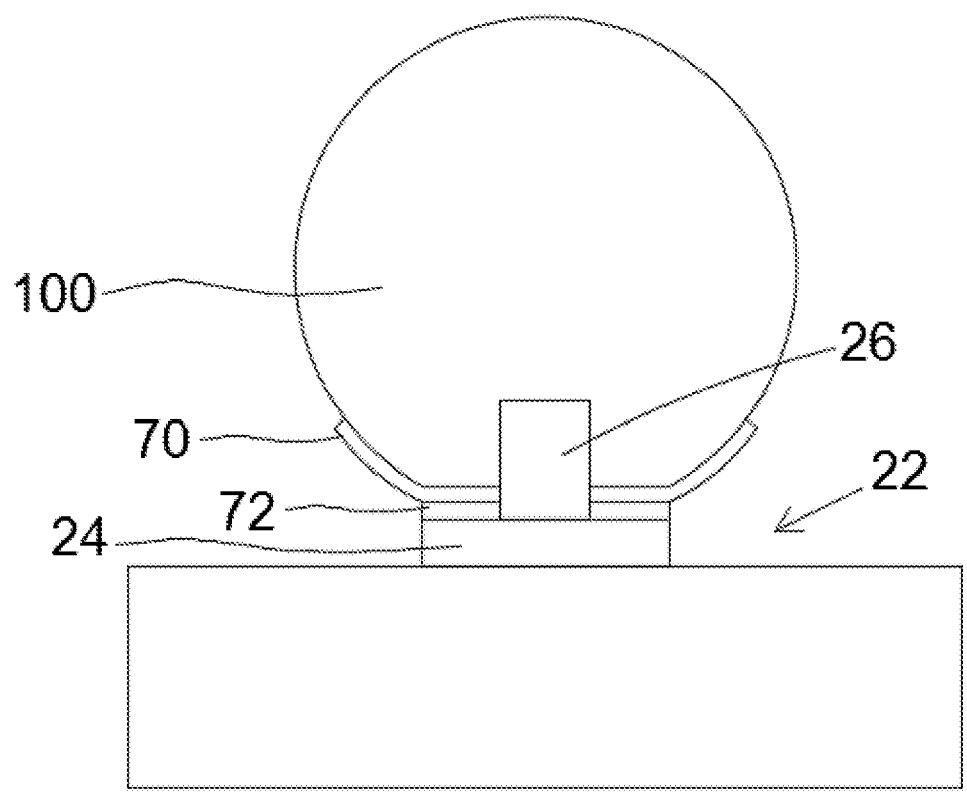
FIG. 9 is a schematic diagram of an adhesive layer of the jig of the electrical discharge machining apparatus of the invention extending to a lateral side of the to-be-machined object.
Figure 10:
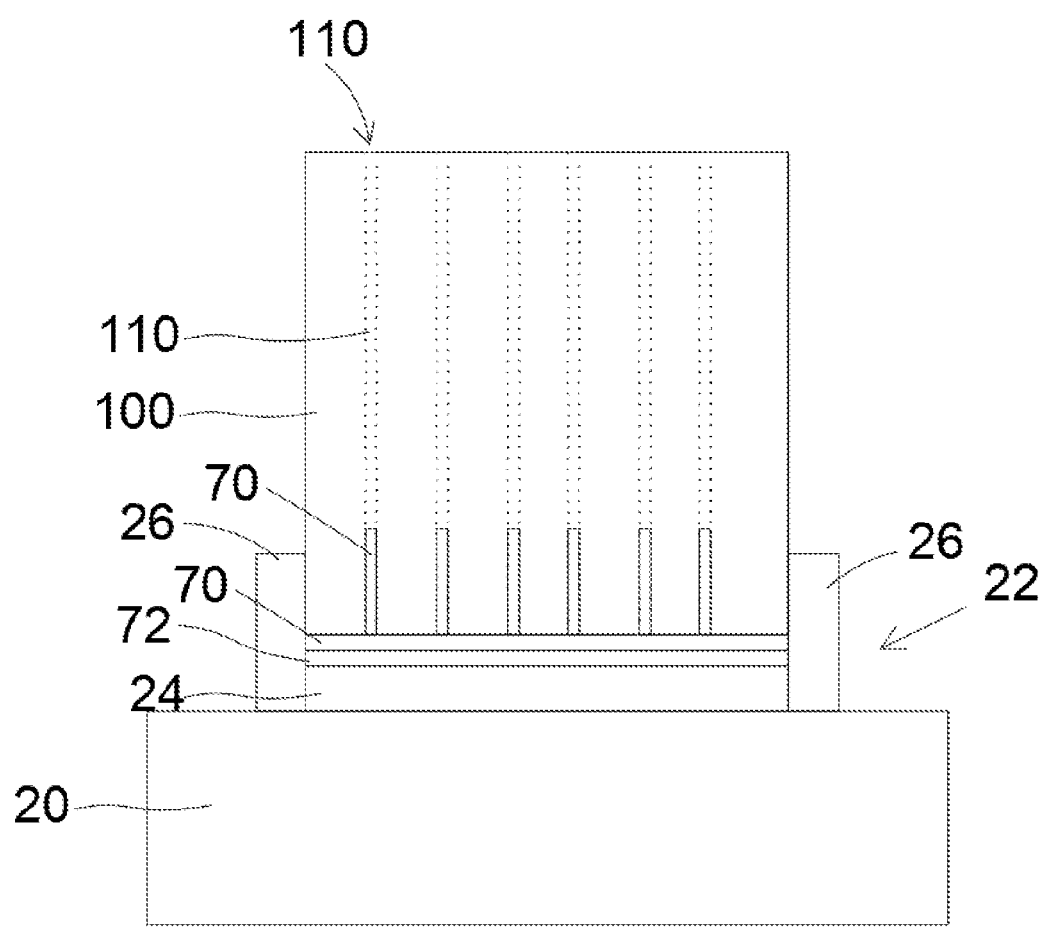
FIG. 10 is a schematic diagram of infiltration of the adhesive layer of the jig of the electrical discharge machining apparatus of the invention into the to-be-machined object.
Figure 11:
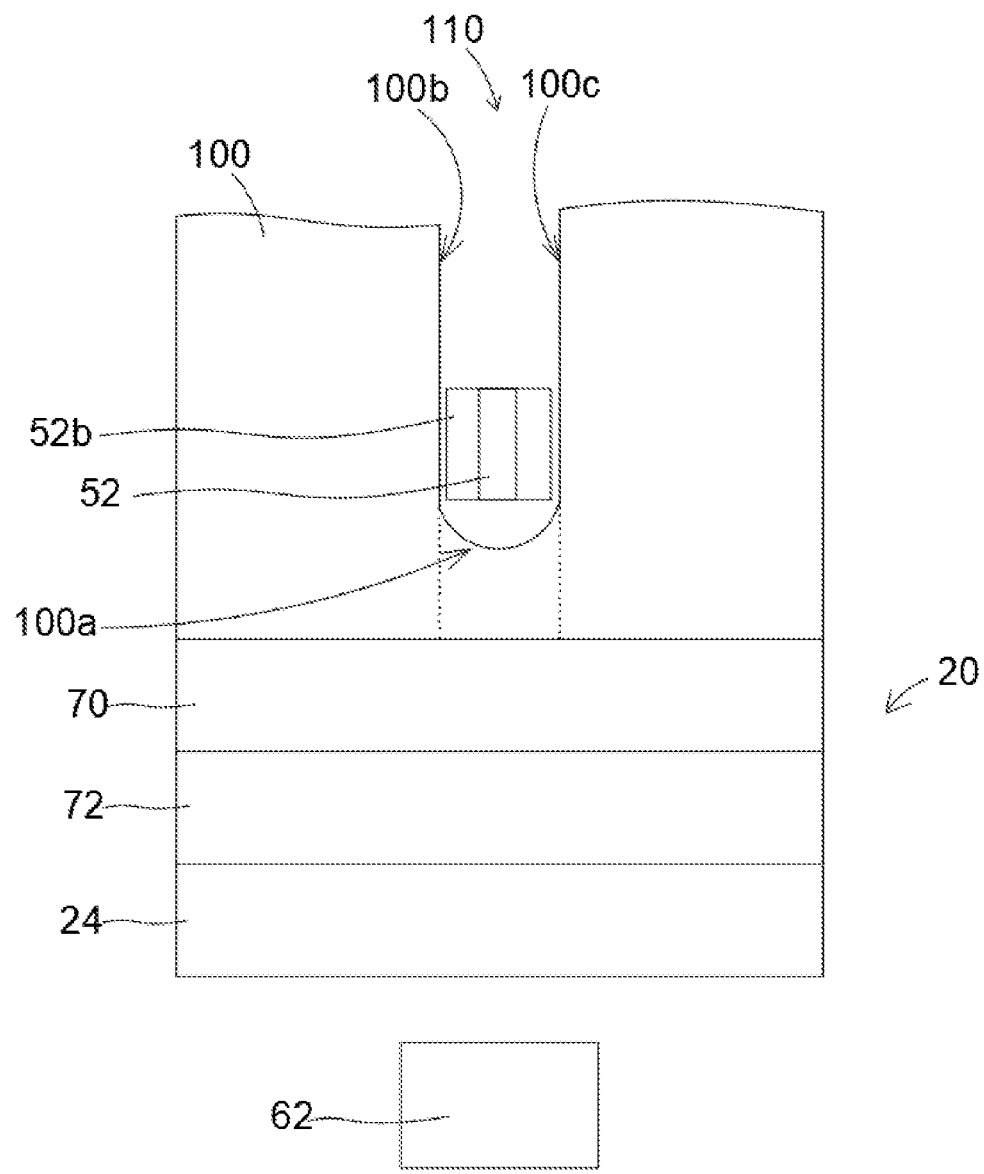
FIG. 11 is a schematic diagram of the electrical discharge machining apparatus of the invention using a positioning unit to fix an orientation of the discharge electrode in the electrical discharge machining procedure.

As shown in FIG. 9, the adhesive layer 70 is not limited to only sticking to a bottom of the to-be-machined object 100, the adhesive layer 70 can also optionally extend upward from the carrier plate 24 (i.e., the bottom of the to-be-machined object 100) to reach a lateral side of the to-be-machined object 100, as long as the to-be-machined object 100 can be firmly adhered, it can be applied to the invention. In addition, as shown in FIG. 10, before sticking to the adhesive layer 70, the invention can also, for example, perform a pre-machining procedure on the to-be-machined object 100, so that an area where the to-be-machined object 100 is to be adhered to the adhesive layer 70 has a rough surface or a gap. Therefore, the adhesive layer 70 can further infiltrate into the to-be-machined object 100 from a surface of the to-be-machined object 100 to improve an adhesion effect, if the adhesive layer 70 is made of a conductive adhesive material, a conductive effect can also be improved. Wherein the adhesive layer 70 can be any suitable material, such as commercially available conductive adhesive materials or non-conductive adhesive materials.

In addition, as shown in FIG. 2 to FIG. 3 and FIG. 8a, a position of the machining target area 110 of the to-be-machined object 100 of the invention is preferably located above the carrier plate 24, that is, a projection line of the machining target area 110 falls between the two side plates 26 instead of the machining target area in the conventional technology being located on an outer side of the side plate of the carrier plate, whereby the invention is capable of reducing jitter phenomenon of the to-be-machined object 100 during the electrical discharge machining procedure, and further capable of avoiding burrs generated on the cut surfaces 100b, 100c of the to-be-machined object 100 before an end of the electrical discharge machining procedure. In addition, in the invention, by locating a position of the machining target area 110 of the to-be-machined object 100 above the carrier plate 24, that is, a position of the machining target area 110 is located between the two side plates 26, the discharge electrode 52 only performs the electrical discharge machining procedure between the two side plates 26. A position of the machining target area 110 of the to-be-machined object 100 is not limited to being located directly above the carrier plate 24, as long as the electrical discharge machining procedure can be performed, any position can be applied to the invention. Therefore, the invention is capable of performing the electrical discharge machining procedure on the entire to-be-machined object 100, and capable of avoiding a drawback that the electrical discharge machining procedure can only be performed on the machining target area on an outer side of the side plate of the carrier plate due to obstruction of the side plate 26 as in the prior art. As shown in FIG. 8b and FIG. 8c, since the invention has provided the adhesive layer 70 on the carrier plate 24 of the jig 22, and the carrier plate 24 is positioned below the machining target area 110, the entire to-be-machined object 100 can be reliably supported. Therefore, even if the side plates 26 are omitted, the invention is still capable of achieving an effect of reducing jitter phenomenon and burr phenomenon, and the electrical discharge machining procedure will not be hindered by the side plates 26 at all.

When an overlapping length between the discharge electrode 52 and the to-be-machined object 100 is too long, the discharge electrode 52 between the pulleys 57a, 57b is likely to generate jitter during a process of cutting the to-be-machined object 100, causing the cut surface to shift or skew. Furthermore, the farther from positions of the pulleys 57a, 57b, the larger a jitter amplitude of the discharge electrode 52. Therefore, the invention can optionally comprise a positioning unit 62 for fixing an orientation of the discharge electrode 52 in a non-contacting manner. For example, the discharge electrode 52 or the electrical shielding structure 52b is, for example, a magnetic element, such as a magnet or a ferrous material, and the positioning unit 62 is, for example, a magnet or an electromagnet capable of generating a magnetic attraction force, and the discharge electrode 52 and the positioning unit 62 are respectively located on opposite sides of the machining target area 110, so as to utilize the magnetic attraction force to act on the above-mentioned magnetic element, so that the discharge electrode 52 can be maintained in a fixed orientation during the electrical discharge machining procedure.

Figure 12A:
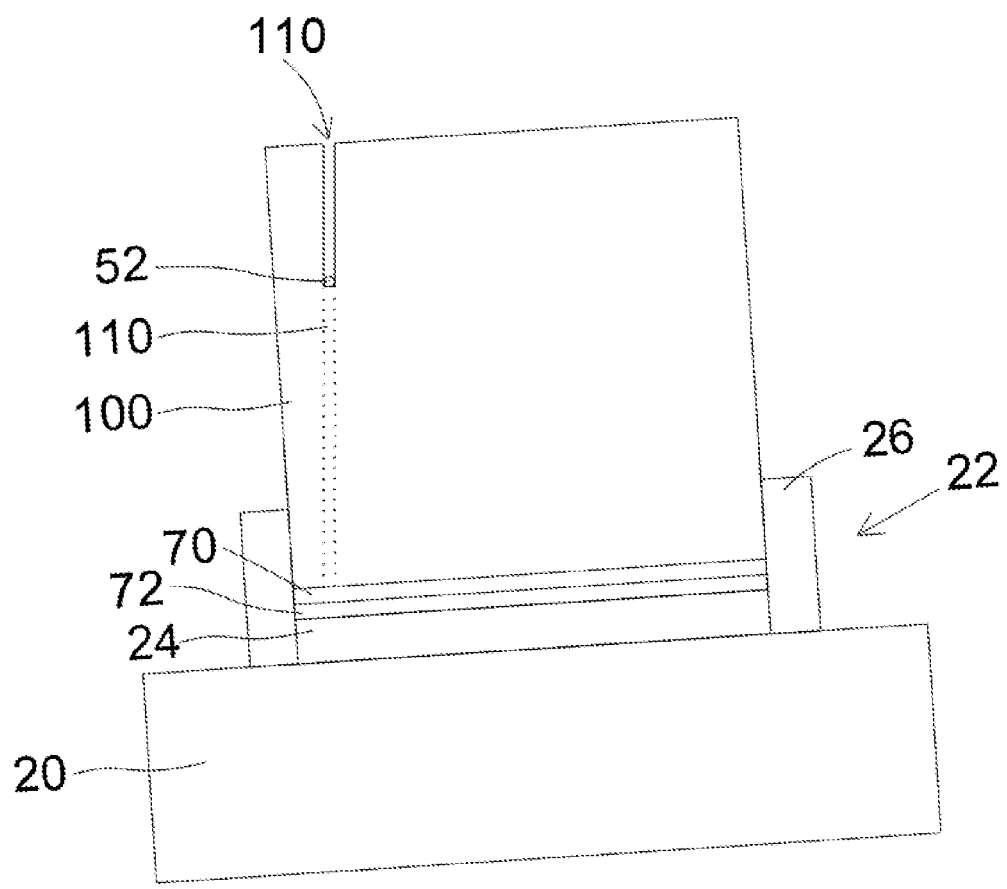
FIGS. 12*a* to 12*b* are schematic diagrams of the off-axis electrical discharge machining procedure performed by the electrical discharge machining apparatus of the invention.
Figure 12B:
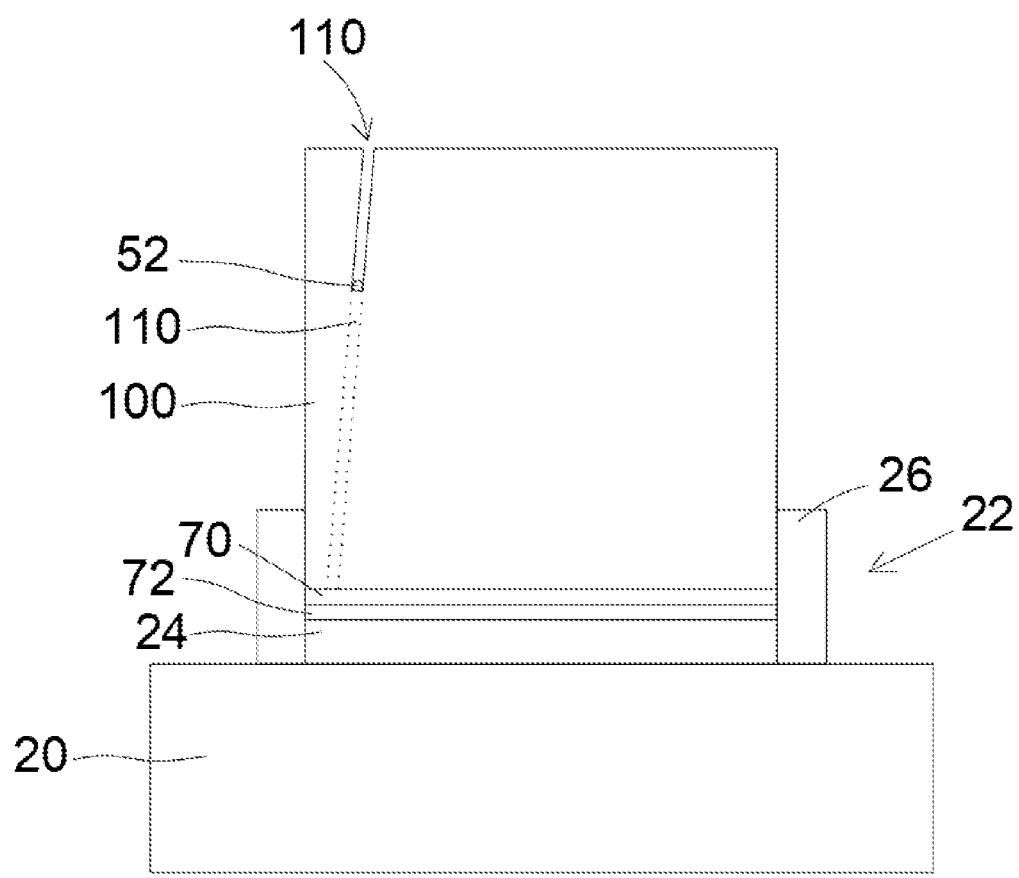

In addition, the invention can further, for example, adjust an included angle of the machining target area 110 of the to-be-machined object 100 relative to the carrier plate 24 of the jig 22, so as to perform the off-axis electrical discharge machining procedure. For example, as shown in FIG. 1 and FIG. 12a, the carrier 20 of the invention can be, for example, a movable carrier with a multi-axis (e.g., 2-axis, 3-axis or more) motor, so as to achieve moving position and even adjusting an inclination of the jig 22 relative to the discharge electrode 52; or as shown in FIG. 1 and FIG. 12b, the wire feeding reel 56a and the wire take-up reel 56b of the electrical discharge machining (EDM) unit 50 of the invention can have, for example, a multi-axis (e.g., 2-axis, 3-axis or more) motor, thereby an inclination of the discharge electrode 52 relative to the to-be-machined object 100 can be adjusted by adjusting a wire feeding direction of the electrical discharge machining (EDM) unit 50.

Figure 13:
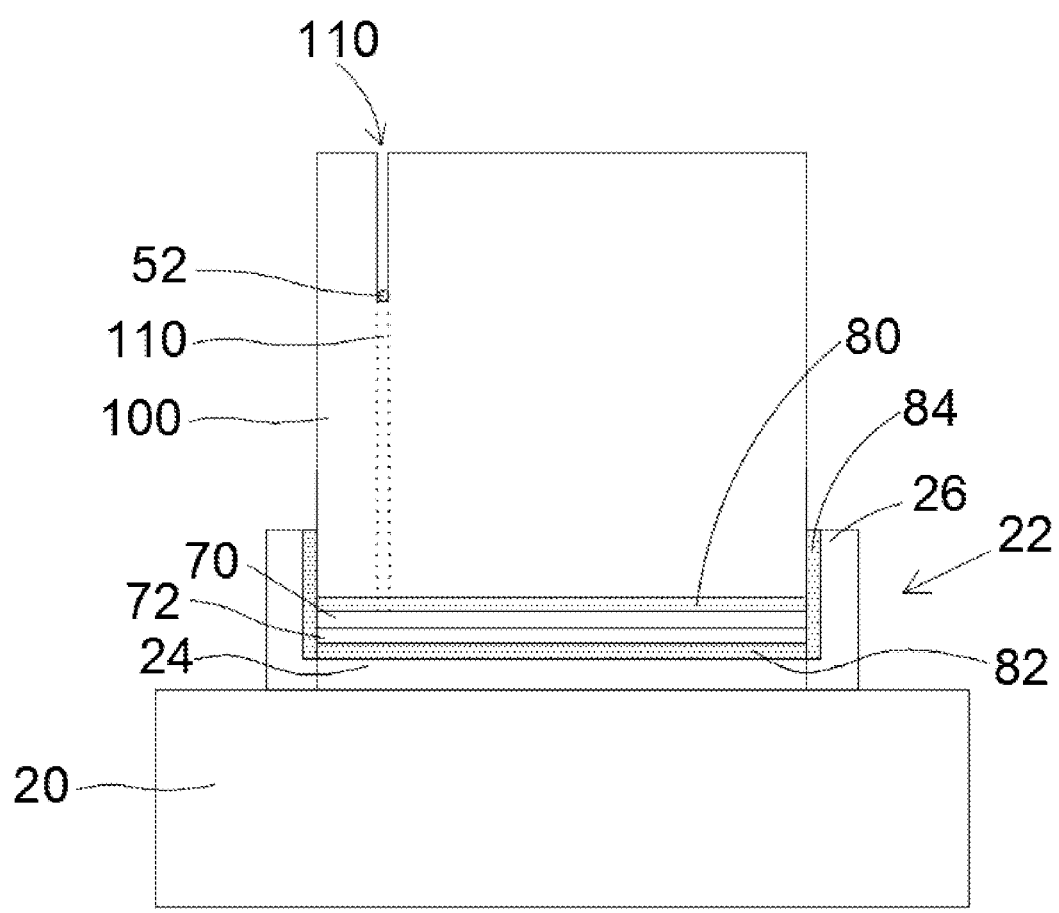
FIG. 13 is a schematic diagram of a conductive gain layer in the invention.
Figure 14:
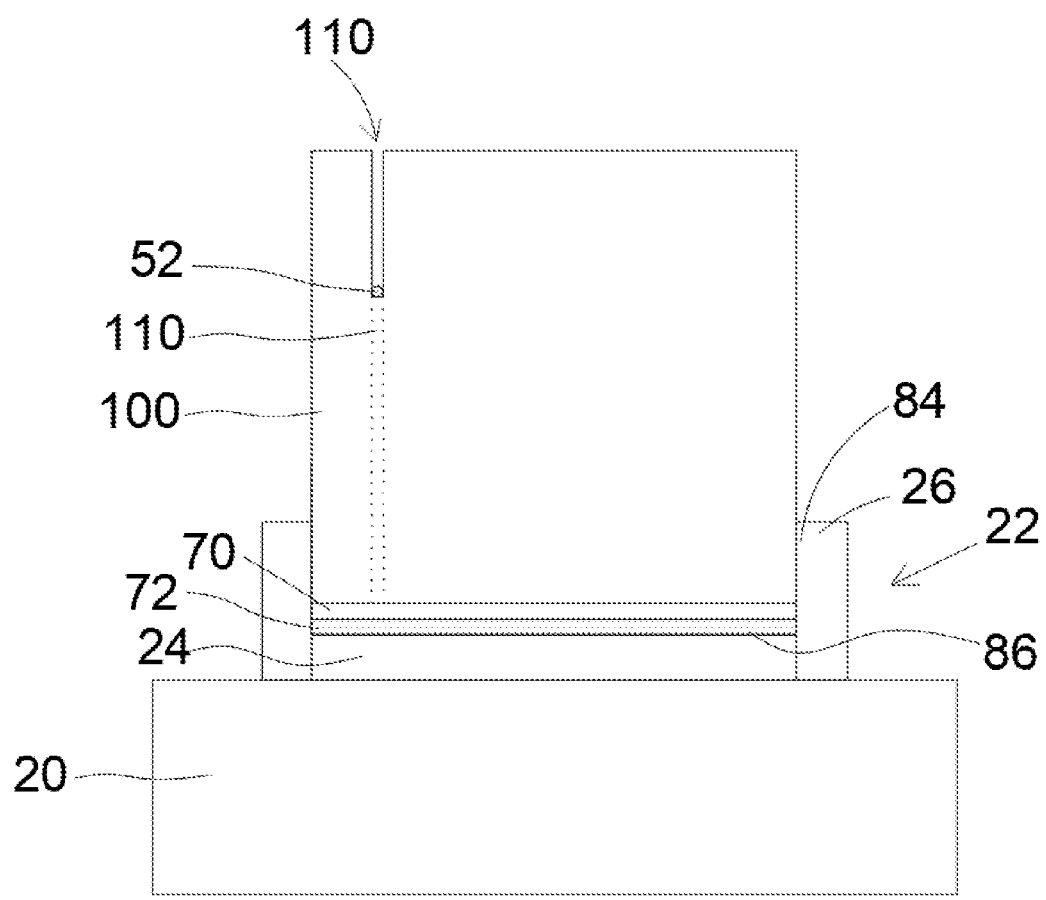
FIG. 14 is a schematic diagram of a conductive plate being the conductive gain layer in the invention.

In addition, in order to improve an efficiency of the electrical discharge machining procedure, the invention is further capable of improving an electrical contact between the to-be-machined object 100 and the jig 22 through a conductive gain layer. For example, as shown in FIG. 13, a conductive gain layer 80 can be formed on the to-be-machined object 100 by means of surface modification, such as by using the electrical discharge machining (EDM) unit 50 or a laser. A composition of the conductive gain layer 80 is determined according to a composition of the to-be-machined object 100, and a position of the conductive gain layer 80 is adjacent to the carrier plate 24 of the jig 22 or directly connected to the carrier plate 24. The invention is capable of improving an electrical contact between the jig 22 and the to-be-machined object 100 by modifying a surface of the to-be-machined object 100. Alternatively, the invention can also form a conductive gain layer 82 and/or a conductive gain layer 84 on the carrier plate 24 and/or the two side plates 26 of the jig 22 by means of film coating to provide good electrical contact, and even the conductive plate 72 can also be coated with a conductive gain layer 86 or the conductive plate 72 itself is the conductive gain layer 86 (as shown in FIG. 14) to provide good electrical contact, and positions of the conductive gain layers 82, 84 can be adjacent to or directly contacting the to-be-machined object 100. Wherein materials of the conductive gain layer 82 and/or the conductive gain layer 84 can be, for example, a same conductive material or different conductive materials, as long as good electrical contact can be provided, any material can be applied to the invention. In addition, the conductive plate 72, the carrier plate 24 and/or the two side plates 26 of the jig 22 themselves can also be composed of, for example, the above-mentioned conductive gain materials of the conductive gain layers 82, 84 and/or the conductive gain layer 86, and the conductive gain materials can be selected from, for example, different conductive materials or a same conductive material, such as different metal materials or a same metal material, as long as good electrical contact can be provided, any material can be applied to the invention. Alternatively, during the electrical discharge machining procedure, materials that are conducive to conducting electricity can also be added in the heated liquid 59b in the heated liquid tank 59a to facilitate performing of the electrical discharge machining procedure, particularly capable of improving an electrical discharge machining efficiency of the to-be-machined object 100 such as semiconductors or poor conductors. A work function of the conductive gain layers 82, 84 and/or the conductive gain layer 86 is, for example, below about 4.5 eV, but not limited thereto, as long as being conducive to improving electrical contact, any work function can be applied to the invention.

Additionally, the invention can also heat the to-be-machined object 100 on the carrier plate 24 through a heat source 90 to improve an electrical contact between the to-be-machined object 100 and the jig 22. The heat source 90 can be, for example, the heated liquid tank 59a, the microwave or radio-frequency source 60, or a laser source and/or an infrared light source. After the to-be-machined object 100 is in contact with the jig 22, heat treatment is performed by using the heat source 90 to improve electrical contact, thereby improving an efficiency of the subsequent electrical discharge machining procedure.

In summary, the electrical discharge machining apparatus of the invention has the following advantages:

(1) The electric field can be concentrated on the traveling direction by the non-uniform electric field distribution design.

(2) The electric field distribution in the non-traveling direction can be reduced by the non-uniform electric field distribution design, so the surface roughness and surface cracks of the to-be-machined object on the non-traveling direction can be reduced.

(3) By disposing the adhesive layer on the jig, jitter phenomenon of the to-be-machined object during a process of the electrical discharge machining procedure can be avoided, and burr phenomenon before an end of the electrical discharge machining procedure can further be avoided.

(4) By disposing the adhesive layer on the jig, the jig hindering performing of the electrical discharge machining procedure on the to-be-machined object can be prevented, so the electrical discharge machining procedure can be performed more flexibly.

(5) With the discharge electrode having a plurality of conductive wires, the cutting step and the grinding or polishing step can be performed at the same time, so performing of the overall machining procedure can be accelerated, and a surface with low roughness can be obtained.

(6) The electrical contact between the to-be-machined object and the jig can be improved by the conductive gain layer of the to-be-machined object and/or the jig, thereby improving an efficiency of the electrical discharge machining procedure.

Note that the specification relating to the above embodiments should be construed as exemplary rather than as limitative of the present invention, with many variations and modifications being readily attainable by a person of average skill in the art without departing from the spirit or scope thereof as defined by the appended claims and their legal equivalents.

What is claimed is:

1. An electrical discharge machining apparatus comprising:
    a carrier, the carrier being provided with a jig, the jig comprising at least one carrier plate for carrying at least one to-be-machined object, wherein the to-be-machined object is defined with a machining target area; and
    an electrical discharge machining (EDM) unit, the electrical discharge machining (EDM) unit applying a discharge energy to the machining target area of the to-be-machined object through at least one discharge electrode with a non-uniform electric field distribution, thereby machining the to-be-machined object along the machining target area,
    the at least one discharge electrode has a guide bump, the guide bump corresponds to a guide groove of a pulley of the electrical discharge machining (EDM) unit, so as to use the guide groove to guide the guide bump.

2. The electrical discharge machining apparatus as claimed in claim 1, wherein two sides of the discharge electrode are coated with an electrical shielding structure, thereby enabling the discharge energy to form the non-uniform electric field distribution.

3. The electrical discharge machining apparatus as claimed in claim 1, wherein the discharge electrode has a recessed area, thereby enabling the discharge energy to form the non-uniform electric field distribution.

4. The electrical discharge machining apparatus as claimed in claim 1, wherein a cross-sectional shape of the discharge electrode is T-shaped, l-shaped or elliptical, thereby enabling the discharge energy to form the non-uniform electric field distribution.

5. The electrical discharge machining apparatus as claimed in claim 2, wherein a cross-sectional shape of the discharge electrode is circular-shaped, thereby enabling the discharge energy to form the non-uniform electric field distribution.

6. The electrical discharge machining apparatus as claimed in claim 1, wherein the discharge electrode is in a shape of a wire or a plate.

7. The electrical discharge machining apparatus as claimed in claim 2, wherein the electrical shielding structure is a supporting structure.

8. The electrical discharge machining apparatus as claimed in claim 7, wherein the supporting structure has the guide bump, the guide bump corresponds to the guide groove of the pulley of the electrical discharge machining (EDM) unit, so as to use the guide groove to guide the guide bump.

9. The electrical discharge machining apparatus as claimed in claim 1, wherein the discharge electrode is a magnetic element, when the discharge electrode machines the to-be-machined object along the machining target area, the electrical discharge machining (EDM) unit acts on the magnetic element with a magnetic attraction force in a non-contact manner, thereby fixing an orientation of the discharge electrode.

10. The electrical discharge machining apparatus as claimed in claim 1, wherein the discharge electrode comprises a first conductive wire and a second conductive wire, and a thickness and/or an applied voltage of the first conductive wire are different from that of the second conductive wire.

11. The electrical discharge machining apparatus as claimed in claim 1, further comprising a microwave or radio-frequency source for providing a microwave or radio-frequency energy to the machining target area of the to-be-machined object through the discharge electrode of the electrical discharge machining (EDM) unit.

12. The electrical discharge machining apparatus as claimed in claim 1, wherein the to-be-machined object and/or the jig further have/has a conductive gain layer, so as to improve an electrical contact between the to-be-machined object and the jig.

13. The electrical discharge machining apparatus as claimed in claim 1, further comprising a heat source for heating the to-be-machined object on the carrier plate, so as to improve an electrical contact between the to-be-machined object and the jig.

14. The electrical discharge machining apparatus as claimed in claim 1, wherein the discharge electrode cuts the machining target area of the to-be-machined object in a fluid.

15. The electrical discharge machining apparatus as claimed in claim 1, wherein the discharge electrode cuts the machining target area of the to-be-machined object in a vacuum environment.

16. The electrical discharge machining apparatus as claimed in claim 1, wherein a quantity of the discharge electrode is one or more than one.

17. The electrical discharge machining apparatus as claimed in claim 1, wherein a quantity of the to-be-machined object is one or more than one.

18. An electrical discharge machining apparatus comprising:
    a carrier, the carrier being provided with a jig, the jig comprising a carrier plate for carrying at least one to-be-machined object, wherein the to-be-machined object is defined with a machining target area, and a position of the machining target area of the to-be-machined object is located above the carrier plate; and
    an electrical discharge machining (EDM) unit for applying a discharge energy to the machining target area of the to-be-machined object through at least one discharge electrode, thereby machining the to-be-machined object along the machining target area,
    the at least one discharge electrode has a guide bump, the guide bump corresponds to a guide groove of a pulley of the electrical discharge machining (EDM) unit, so as to use the guide groove to guide the guide bump.

19. The electrical discharge machining apparatus as claimed in claim 18, wherein the jig further has two side plates disposed on two ends of the carrier plate, and the two side plates are used to be located on two sides of the to-be-machined object, respectively.

20. The electrical discharge machining apparatus as claimed in claim 18, wherein the jig has an adhesive layer disposed on the carrier plate, and a periphery of the to-be-machined object is partially adhered on the adhesive layer of the jig.

21. The electrical discharge machining apparatus as claimed in claim 20, wherein the adhesive layer is a conductive adhesive layer.

22. The electrical discharge machining apparatus as claimed in claim 20, wherein the adhesive layer is discontinuously disposed on the carrier plate.

23. The electrical discharge machining apparatus as claimed in claim 20, wherein the adhesive layer extends upward from the carrier plate to reach at least one side of the to-be-machined object.

24. The electrical discharge machining apparatus as claimed in claim 20, wherein the adhesive layer infiltrates into the to-be-machined object.

25. The electrical discharge machining apparatus as claimed in claim 18, wherein the jig has a conductive plate disposed on the carrier plate.

26. The electrical discharge machining apparatus as claimed in claim 20, wherein the jig has a conductive plate disposed on the carrier plate, and the adhesive layer is disposed on the conductive plate.

27. The electrical discharge machining apparatus as claimed in claim 25, wherein the conductive plate is a conductive metal structure with a work function below 4.5 eV.

28. The electrical discharge machining apparatus as claimed in claim 18, wherein the discharge electrode applies the discharge energy to the machining target area of the to-be-machined object with a non-uniform electric field distribution.

29. The electrical discharge machining apparatus as claimed in claim 18, wherein the carrier adjusts an inclination of the jig relative to the discharge electrode or the electrical discharge machining (EDM) unit adjusts an inclination of the discharge electrode relative to the to-be-machined object, so as to adjust an included angle of the machining target area of the to-be-machined object relative to the carrier plate of the jig.

30. The electrical discharge machining apparatus as claimed in claim 18, wherein the to-be-machined object and/or the jig further have/has a conductive gain layer, so as to improve an electrical contact between the to-be-machined object and the jig.

31. The electrical discharge machining apparatus as claimed in claim 18, further comprising a heat source for heating the to-be-machined object on the carrier plate, so as to improve an electrical contact between the to-be-machined object and the jig.

32. The electrical discharge machining apparatus as claimed in claim 18, wherein the discharge electrode cuts the machining target area of the to-be-machined object in a fluid.

33. The electrical discharge machining apparatus as claimed in claim 18, wherein the discharge electrode cuts the machining target area of the to-be-machined object in a vacuum environment.

34. The electrical discharge machining apparatus as claimed in claim 18, wherein a quantity of the discharge electrode is one or more than one.

35. The electrical discharge machining apparatus as claimed in claim 18, wherein a quantity of the to-be-machined object is one or more than one.

* * * * *